(12) United States Patent
Fok et al.

(10) Patent No.: US 7,843,991 B2
(45) Date of Patent: Nov. 30, 2010

(54) METHODS AND APPARATUS FOR MONITORING VOICE QUALITY ON A WIRELESS COMMUNICATION DEVICE

(75) Inventors: Kenny Fok, San Diego, CA (US); Tia Manning Cassett, San Diego, CA (US); Eric Chi Chung Yip, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 990 days.

(21) Appl. No.: 11/405,927

(22) Filed: Apr. 17, 2006

(65) Prior Publication Data

US 2006/0252376 A1 Nov. 9, 2006

Related U.S. Application Data

(60) Provisional application No. 60/674,165, filed on Apr. 21, 2005.

(51) Int. Cl.
*H04B 3/46* (2006.01)
*H04B 17/00* (2006.01)
*H04Q 1/20* (2006.01)

(52) U.S. Cl. ................... 375/224; 375/219; 375/316; 370/241

(58) Field of Classification Search ............ 375/224, 375/219, 316; 370/241
See application file for complete search history.

(56) References Cited

U.S. PATENT DOCUMENTS

| 6,446,123 | B1 | 9/2002 | Ballantine et al. |
| 6,512,752 | B1 | 1/2003 | H'mimy et al. |
| 6,700,953 | B1 * | 3/2004 | Maurer et al. ............ 379/88.01 |
| 6,728,228 | B1 * | 4/2004 | Ostman et al. ............. 370/332 |
| 7,099,280 | B1 * | 8/2006 | Shaffer et al. .............. 370/252 |
| 7,502,337 | B2 * | 3/2009 | Kosanovic et al. ......... 370/286 |
| 2004/0071084 | A1 | 4/2004 | El-Hennawey et al. |

FOREIGN PATENT DOCUMENTS

| WO | WO0122600 A2 | 8/2000 |
| WO | WO02063858 A1 | 8/2002 |

OTHER PUBLICATIONS

International Search Report - PCT/US06/014995, International Searching Authority - European Patent Office, Sep. 26, 2006.

(Continued)

*Primary Examiner*—Ted M Wang
(74) *Attorney, Agent, or Firm*—Sandip S. Minhas; Nicholas A. Cole

(57) ABSTRACT

Methods and apparatus for providing monitoring of voice quality and diagnostic data related to voice quality on a wireless device. Monitoring thresholds can be implemented that allow for additional precautionary measures and/or further monitoring to occur if a threshold level of voice quality performance is experienced. The results of the voice and diagnostic monitoring can be communicated to the service provider who can then collect, analyze and generate reports to assess and determine quality-related problems experienced by the communication network.

135 Claims, 7 Drawing Sheets

OTHER PUBLICATIONS

Written Opinion - PCT/US06/014995, International Searching Authority - European Patent Office, Sep. 26, 2006.

Stefan Wanstedt, et al.: "Development of an objective speech quality measurement model for the AMR codec," Measurement of Speech and Audio Quality in Networks, International On-Line Workshop MESAQIN, Jan. 2002.

Marc Werner, et al.: "Parameter-Based Speech Quality Measures for GSM," The 14th IEEE 2003 International Symposium on Personal, Indoor and Mobile Radio Communication Proceedings, Beijing, Sep. 2003.

"State of the Art Voice Quality Testing," White Paper by OPTICOM Gmbh, Germany, Jun. 2000.

A. Kajackas and A. Anskaitis: "Investigation the Ability of Objective Measures of the Perceptual Speech Quality in Mobile Networks," ISSN 1392-1215 Elektronika IR Elektrotechnika. 2005. Nr. 7(63), Aug. 2005.

A. Kajackas, et al.: "Estimation of QoS Dynamics in the Wireless Networks," 4th Management Committee Meeting, COST 290, Wuerzburg, Germany, Oct. 2005.

"User Description, Speech Quality Supervision," Ericsson User Description, Dec. 1999.

A. Karlsson, et al.: "Radio Link Parameter Based Speech Quality Index—SQI," Ericsson Research IEEE Workshop on Speech Coding Proceedings Model, Coders and Error Criteria, Porvoo, Finland, published Dec. 1999.

* cited by examiner

METHODS AND APPARATUS FOR MONITORING VOICE QUALITY ON A WIRELESS COMMUNICATION DEVICE

CLAIM OF PRIORITY UNDER 35 U.S.C. §119

The present Application for Patent claims priority to Provisional Application No. 60/674,165 entitled "Methods an Apparatus for Monitoring Voice Quality in a Wireless Device" filed Apr. 21, 2005, and assigned to the assignee hereof and hereby expressly incorporated by reference herein.

BACKGROUND

The described aspects relate generally to wireless communication devices and network communication. More particularly, the described aspects relate to monitoring voice quality on a wireless communication device along with the collection, reporting and analysis of voice/data processing-related data from the wireless device.

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network.

Wireless communications devices, such as mobile phones, pagers, handheld computers, etc., are becoming increasingly popular for both business and personal use. One advantage of such devices is their "wireless" aspect, allowing them to be utilized whenever and wherever a user desires. As the use of wireless devices grows, and as the associated wireless communications networks grow, users have an ever-increasing expectation of high-quality wireless communication. Thus, one aspect of user satisfaction when utilizing a wireless device deals with the quality of the voice transmitted and received by the wireless device.

The voice quality experienced on a wireless device is affected by many different network conditions. For example, voice quality can be affected by the Radio Frequency (RF) conditions, the number of base stations (i.e., cell sites) in a geographical area, the number of cell site hand-offs experienced by a mobile wireless device and the like. As is the case in many instances, when a user experiences persistent voice quality related problems, the frustrated user may choose to change service providers, with the hope that an alternative service provider will provide better voice quality service. From the service provider standpoint, frustrated users who choose to change service providers results in lost customers; i.e. lost revenues.

Currently, many different means exist to measure the quality of voice in a wireless communication network. For example, in voice telephony, especially when codecs are used to compress the bandwidth requirement of a digitized voice connection, the Mean Opinion Score (MOS) provides a numerical indication of the perceived quality of received human speech over the connection. The MOS is typically derived by executing an associated MOS algorithm or routine. The MOS is expressed as a single number in the range 1 to 5, where 1 is lowest perceived quality, and 5 is the highest perceived quality. Many different algorithms can also be implemented to provide voice quality scores or measurements. For example, Single Sided Speech Quality Measure ("3SQM"), E-Model, Voice Quality Monitor (VQmon), Perceptual Evaluation of Speech Quality (PESQ), Perceptual Speech Quality Measure (PSQM); all of which are published and standardized by the International Telecommunications Union (ITU). However, the aforementioned voice quality measurement tests are limited in implementation to field tests, in which a field technician travels throughout the network to gauge the effectiveness of the network or as quality control tests on newly manufactured or repaired wireless devices.

Therefore, a need exists to develop devices, apparatus and methods for monitoring voice quality of "in-use" wireless devices, or devices being used by the final customer or user. Such monitoring of the voice quality of "in-use" wireless devices would provide service providers with real-time data on network performance. By providing service providers with real-time network performance data, the service providers can efficiently and effectively pinpoint network-related and/or device-related problems, thereby, providing user/customers with proactive support. In this regard, the service provider can gain an insight into existing or potential network-related and/or device-related concerns and/or deficiencies and proactively correct the problems. Additionally, service providers often provide users with service level commitments as part of Service Level Agreements (SLAs). Currently, no means exists to accurately and efficiently measure and monitor the performance of these commitments. Therefore, an additional need exists to provide real-time monitoring of network performance, in the form of voice quality monitoring, so that service providers can effectively honor their SLAs.

SUMMARY

The present methods, apparatus, device, processors and computer-program modules provide for continuous monitoring of voice quality and diagnostic data related to voice quality on a wireless device. The results of the monitoring can be communicated, in real-time, to the service provider who can then collect, analyze and/or generate reports based on the voice quality data and the diagnostic data. The generated reports provide the basis for assessing quality-related problems experienced by the communication network. In this regard, the service provider can efficiently and effectively address network problems and/or device problems, thereby providing proactive support to users/customers. Monitoring thresholds can be implemented that allow for additional precautionary measures and/or further monitoring if a threshold level of voice quality performance is experienced.

In one aspect, a method for monitoring voice quality performance on a wireless communication device is defined. The method, performed at a wireless device, includes monitoring voice data and related diagnostic data, determining a voice quality score based upon the voice data and communicating the diagnostic data and at least one of the voice quality score or the voice data to a network device. According to some aspects, determining the voice quality score involves executing a voice quality algorithm, such as a Mean Opinion Score (MOS) algorithm, Single Sided Speech Quality Measure (3SQM) algorithm, E Model algorithm, Voice Quality Monitor (VQmon) algorithm, Perceptual Evaluation of Speech Quality (PESQ) algorithm, Perceptual Speech Quality Measure (PSQM) algorithm or the like. In alternate aspects, the method may include comparing the voice quality score to thresholds and, if a threshold is met, taking an appropriate action. An appropriate action may include monitoring the voice quality data at an increased interval or monitoring based on the occurrence of predetermined events. Other appropriate actions to be taken if a threshold is met may include monitoring additional diagnostic data, such as geographic position of the device, Radio Frequency (RF) conditions and the like and/or sending an alert notification to the wireless device user and/or the service provider.

In another aspect, a computer-readable medium for measuring voice quality on a wireless communication device is defined. The computer-readable medium includes at least one sequence of instructions that are executable by a wireless device processor to cause the processor to perform the steps of monitoring voice data and related diagnostic data, determining a voice quality score based upon the voice data and communicating the voice quality score and the related diagnostic data to a network device.

In another alternate aspect, a processor device, implemented a wireless communication device is defined. The processor is configured to perform the operations of monitoring voice data and related diagnostic data, determining a voice quality score based upon the voice data and communicating the voice quality score and the diagnostic data to a network device.

A wireless communication device for monitoring voice quality also defines present aspects. The device includes a storage unit operable for storing voice data and diagnostic data and a voice-monitoring module in communication with the storage unit, the voice-monitoring module being operable for determining a voice quality score based upon the voice data and communicating the voice quality score and the related diagnostic data to a network device. The voice-monitoring module may further include a voice quality routine that is executed to determine the voice quality score. Additionally, the voice-monitoring module may further be operable for comparing the voice quality score to one or more predetermined voice quality score thresholds and, if a threshold is met increasing the rate of voice quality score determination, communicating the voice quality data to the network device, monitoring additional diagnostic data, and/or sending an alert notification to the device user and/or the service provider.

In yet another aspect, a method for analyzing voice quality performance in a wireless communication is defined. The method includes receiving, at the network device, voice quality scores and related diagnostic data from one or more wireless communication devices; analyzing the voice quality scores and the diagnostic data and generating one or more voice quality reports based on the voice quality scores and the related diagnostic data. The generated voice quality report provides information that correlated diagnostic data to voice problems experienced on one or more wireless communication devices. Voice quality reports that are generated by the network device may include, but are not limited to, base-station voice quality report, a geographic-area voice quality report, a wireless communication device-type voice quality report and a wireless communication device voice quality report.

A further aspect is defined by a method for configuring the monitoring of voice quality on a wireless device. The method includes configuring, at a network device, voice monitoring parameters and diagnostic monitoring parameters related to voice monitoring and communicating the voice monitoring parameters and diagnostic monitoring parameters to one or more wireless communication devices operable for monitoring voice data and diagnostic data according to the voice monitoring parameters and diagnostic monitoring parameters. The voice quality parameters may include voice data, monitoring interval, monitoring schedule, monitoring triggering event, voice score algorithm, threshold condition and threshold limit. The diagnostic monitoring parameters may include position-monitoring parameters, power monitoring parameters, hardware monitoring parameters, application monitoring parameters and network device monitoring parameters data.

Yet another aspect is defined by a computer-readable medium for analyzing voice quality performance in a wireless communication. The computer-readable medium includes a sequence of instructions and execution of the instructions by a processor causes the processor to perform the steps of receiving voice quality scores and diagnostic data from a plurality of wireless communication devices, analyzing the voice quality scores and diagnostic data; and generating one or more voice quality reports based on the voice quality scores and related diagnostic data.

Further, an aspect is described as being at least one processor device, implemented in a network device, configured to perform the operations of receiving voice quality scores and related diagnostic data from one or more wireless communication devices, analyzing the voice quality scores and diagnostic data and generating one or more voice quality reports based on the voice quality scores and related diagnostic data.

In an alternate aspect, a network device for managing wireless communication device voice quality is defined. The network device includes a voice quality parameter-generating module operable to receive voice quality scores and related diagnostic data from wireless communication devices. The network device also includes a storage module operable for storing the voice quality scores and the related diagnostic data and a voice quality report-generating module in communication with the storage module, wherein the voice quality report-generating module is operable for generating voice quality reports based on the voice quality scores and related diagnostic data.

Thus, the aspects herein described provide for continuous monitoring of voice quality and related diagnostic data on a wireless device. The results of the monitoring can be communicated to the service provider who can then collect, analyze and/or generate reports based on the voice quality scores and related diagnostic data to assess quality-related problems experienced by the communication network. In this regard, the service provider can efficiently and effectively address network-problems, thereby providing proactive support to users/customers. Monitoring thresholds can be implemented that allow for additional precautionary measures and/or further monitoring to occur if a threshold level of voice quality performance is experienced.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

The present devices, apparatus, methods, computer-readable media and processors now will be described more fully hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

Figure 1:
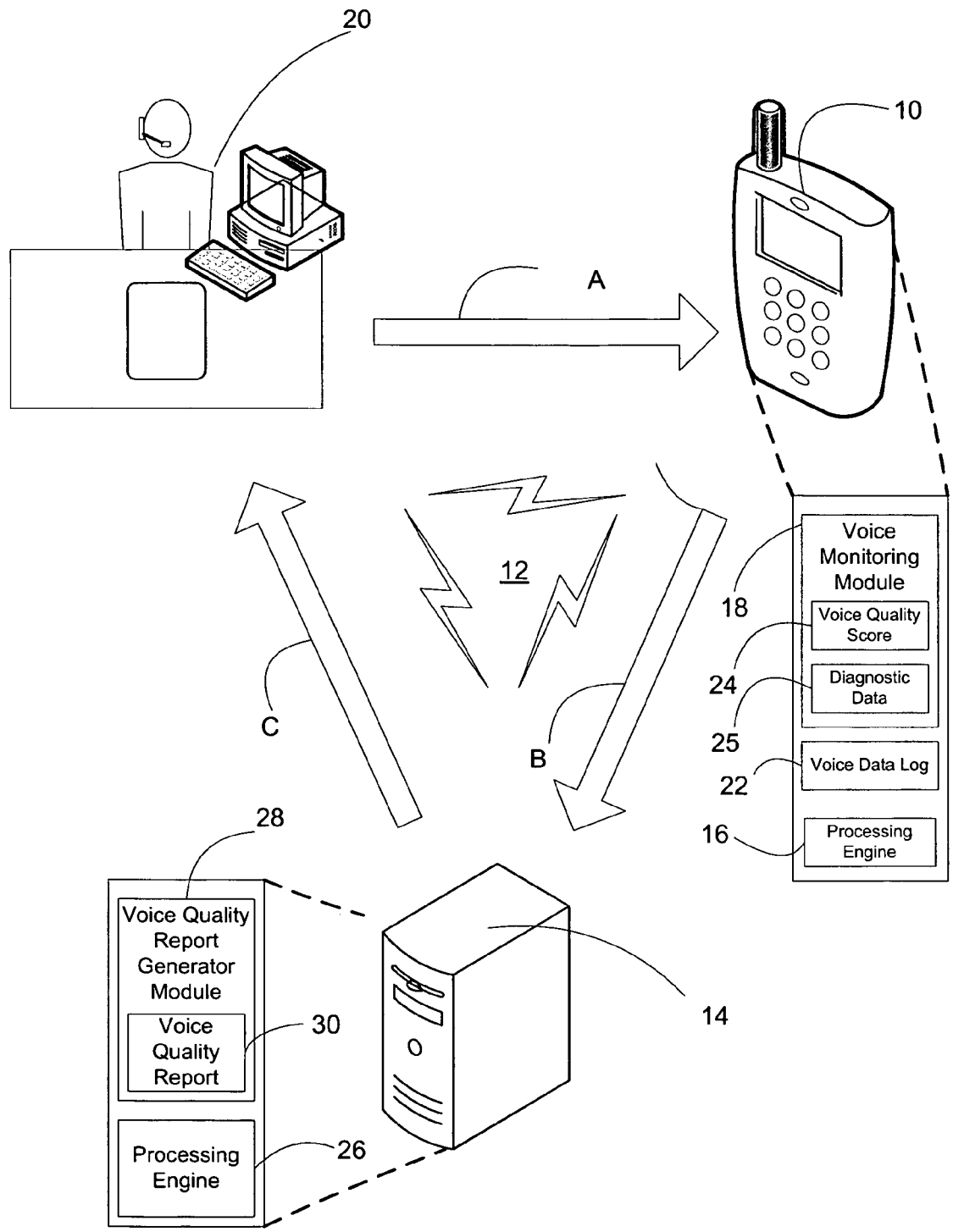
FIG. 1 is a schematic diagram of a system for providing voice quality monitoring on a wireless device, according to one aspect.

According to one aspect, FIG. 1 provides a schematic diagram representation of a system for monitoring voice quality at a wireless device. The system includes one or more wireless devices 10 that are in wireless communication, via wireless network 12, with a network device 14, such as user manager server 14. The wireless device includes a processing engine 16 that is operable to execute a voice-monitoring module 18. The voice-monitoring module may be initially downloaded to the wireless device from a service provider 20, such as customer care representative 20 (designated by Arrow A). Alternatively, the voice-monitoring module may be pre-installed by the wireless device manufacturer or otherwise loaded onto the wireless device.

The voice-monitoring module 18 is operable for monitoring and logging voice data 22 at either predetermined intervals or at the occurrence of predetermined events. The logged voice data 22 is used by the voice-monitoring module 18 to determine a voice quality score 24. Additionally, the voice-monitoring module is monitoring and logging (or otherwise capturing) diagnostic data 25 that is related to the voice performance of the wireless device. The voice quality score 24 and/or the voice data 22 and the related diagnostic data 25 are wirelessly communicated to the network device 14 (designated by Arrow B). The network device 14 includes a processing engine 26 that is operable to execute a voice quality report-generator module 28. The voice quality report generator module 28 is operable to generate one or more voice quality reports 30 by analyzing the voice quality scores and the related diagnostic data communicated from the one or wireless devices. The voice quality reports provide correlation between the voice quality and the diagnostic data such that the reports assist in determining the cause or causes of voice performance degradation on one or more wireless devices. In turn, the voice quality reports 30 may be communicated to the service provider 20 (designated by Arrow C) or to any other interested party for the purpose of managing the wireless network or monitoring the voice quality performance of the wireless devices deployed in the network.

Figure 2:
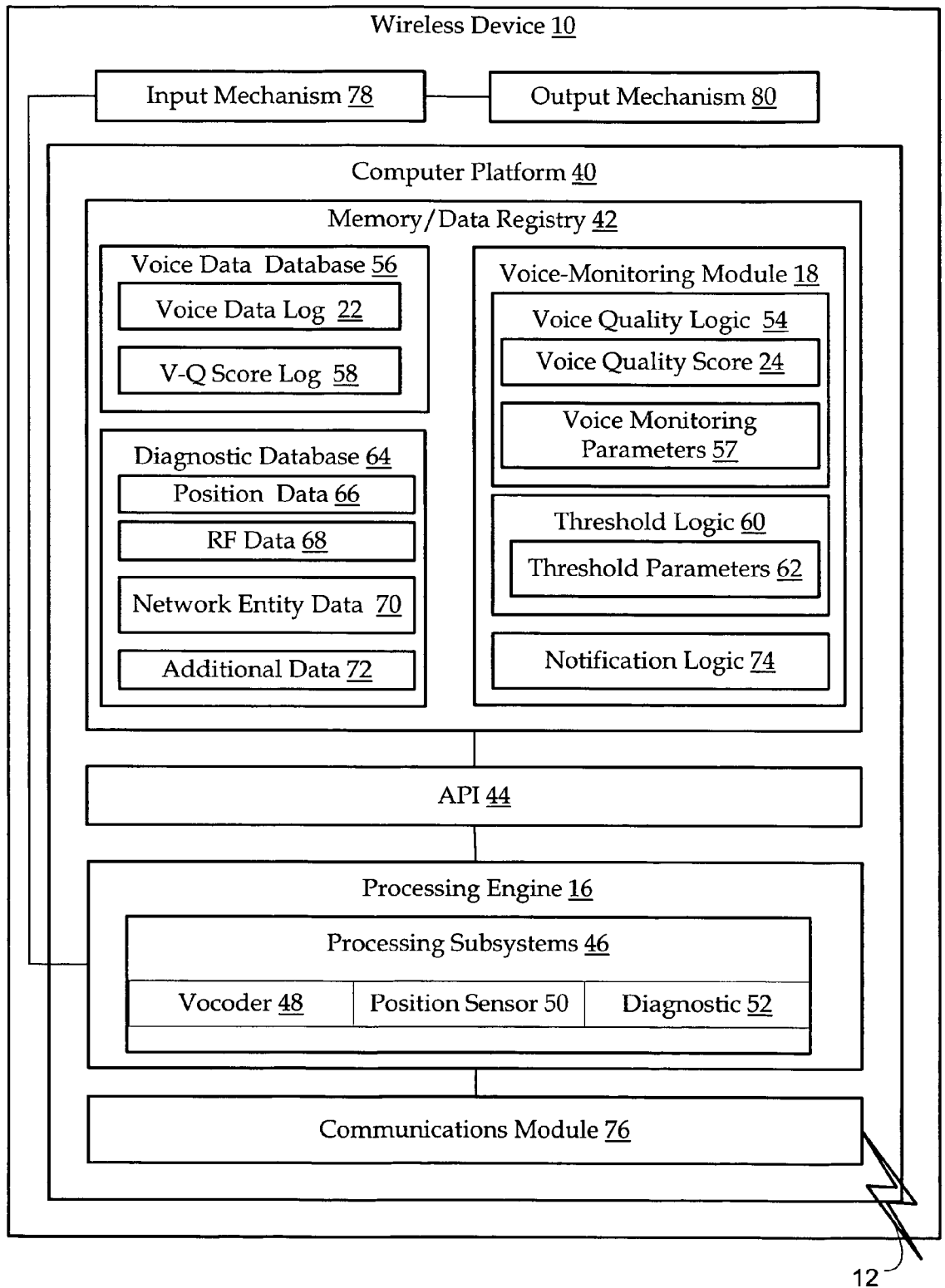
FIG. 2 is a block diagram of a wireless communication device that is operable to monitor voice quality; according to one aspect.

Referring to FIG. 2, according to one aspect, a block diagram representation of a wireless communication device operable to monitor voice quality is depicted. The wireless device 10 may include any type of computerized, wireless device, such as cellular telephone, Personal Digital Assistant (PDA), two-way text pager, portable computer, and even a separate computer platform that has a wireless communications portal, and which also may have a wired connection to a network or the Internet. The wireless device can be a remote-slave, or other device that does not have an end-user thereof but simply communicates data across the wireless network 12, such as remote sensors, diagnostic tools, data relays, and the like. The present apparatus and methods can accordingly be performed on any form of wireless device or computer module, including a wired or wireless communication portal, including without limitation, wireless modems, PCMCIA cards, access terminals, personal computers, telephones, or any combination or sub-combination thereof.

The wireless device 10 includes computer platform 40 that can transmit data across wireless network 12, and that can receive and execute routines and applications and optionally display data transmitted from network device 14, such as a user manager server 14 or another computer device connected to wireless network 12. Computer platform 40 includes a memory/data registry 42, which may comprise volatile and nonvolatile memory such as read-only and/or random-access memory (RAM and ROM), EPROM, EEPROM, flash cards, or any memory common to computer platforms. Further, data registry 42 may include one or more flash memory cells, or may be any secondary or tertiary storage device, such as magnetic media, optical media, tape, or soft or hard disk.

Further, computer platform 40 also includes a processing engine 16, which may be an application-specific integrated circuit ("ASIC"), or other chipset, processor, logic circuit, or other data processing device. Processing engine 16 or other processor such as ASIC may execute an application programming interface ("API") layer 44 that interfaces with any resident programs, such as voice-monitoring module 18, stored in the data registry 42 of the wireless device 10. API 44 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 16 includes various processing subsystems 46 embodied in hardware, firmware, software, and combinations thereof, that enable the functionality of wireless device 10 and the operability of the wireless device on wireless network 12. For example, processing subsystems 46 allow for initiating and maintaining communications, and exchanging data, with other networked devices. In present aspects, in which the voice-monitoring module 18 relies on subsystems to generate data, such as voice data, geographical position data, radio frequency (RF) data and the like, the subsystems may include, but are not limited to, vocoder monitor subsystem 48, position determination subsystem 50, diagnostic monitor subsystem 52 and the like. In aspects in which the wireless device is defined as a cellular telephone the communications processing engine 16 may additionally include one or a combination of processing subsystems 46, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not depicted in FIG. 2 for the sake of clarity). For the disclosed aspects, processing subsystems 46 of processing engine 16 may include any subsystem components that interact with applications executing on computer platform 40. For example, processing subsystems 46 may include any subsystem components that receive data reads and data writes from API 44 on behalf of the voice-monitoring module 18.

The data registry 42 of computer platform 40 includes a voice-monitoring module 18 that is operable for executing voice quality logic 54. The voice quality logic is in communication with the voice data database 56 that logs voice data 22. The voice quality logic relies upon configurable voice monitoring parameters 57 that define monitoring characteristics. For example, voice-monitoring parameters 57 may be configured such that the voice quality logic monitors, i.e., logs voice data at a predetermined time interval, within a predetermined time range and/or at the occurrence of a predetermined event. Additionally, voice-monitoring parameters may be configured to define the monitored voice data. In some aspects, the monitored voice data may be defined as voice samples that are logged from the vocoder monitor subsystem 48 using the API layer 44.

In some aspects, the voice-quality logic 54 is in communication with the diagnostic database 64 that logs or otherwise stores diagnostic data that is related to the voice performance of the wireless device 10. The diagnostic data will typically be defined as data that has a negative or positive affect on voice quality performance. Diagnostic Data is subsequently communicated to the network device 14 and is used in generating voice-quality reports that correlate the diagnostic data with the voice score data for the purpose of determining the cause or causes of voice degradation on the wireless device. In this regard, diagnostic database 64 may be configured to store wireless device-specific data and/or may be data related to interaction between the wireless device and the wireless network. In some aspects, the diagnostic data may include geographic position data, radio frequency (RF) data, and network devices in communication with the wireless device and the like. For example, diagnostic database 64 may include geographic position data 66, RF environment data 68, network entity data 70, such as identification of network node (i.e., IP base stations, mobile switching centers or the like) in communication with the wireless device or any other predetermined additional data 72, such as wireless device hardware performance data, application/software performance data or the like.

The geographic position data 66 may be retrieved from the Global Positioning System (GPS) monitoring subsystem 50 that includes appropriate GPS mechanisms. The RF data provides, for example, wireless device signal power data and may be retrieved from the diagnostic monitoring subsystem 52. Relevant RF data retrievable from the diagnostic monitoring subsystem 52 may include, but is not limited to, "searcher and finger" information for wireless devices employing Code-Division Multiple Access (CDMA) protocol communication and wideband code division multiple access "finger" information for terminal adapter (TA) for devices employing Universal Mobile Telecommunications System (UMTS) protocol communication.

The voice quality logic determines a voice quality score 24 based on the monitored voice data 22. In many aspects, the voice quality logic 54 will execute one or more voice quality algorithms or routines to determine one or more voice quality scores 24. In some aspects, the voice quality score is defined as a Mean Opinion Score (MOS) that may be calculated using any known or future MOS algorithm. Examples of known MOS algorithms include Single Sided Speech Quality Measure ("3SQM"), defined by International Telecommunications Union (ITU) standard P.563; Perceptual Speech Quality Measure ("PSQM") defined by ITU standard P.861; Perceptual Evaluation of Speech Quality ("PESQ") defined by ITU standard P.862; E Model defined by ITU standard G.107; Voice Quality Monitor ("VQmon") an extension of E Model not yet standardized by ITU and the like. It should be noted that the implementation of any one voice quality algorithm or MOS algorithm in the described aspects is not viewed as limiting, the aspects herein described can be implemented using any currently known algorithm or any algorithm developed in the future. Voice quality scores 24 may be logged in the voice quality score log 58 that is stored in the voice data database 56.

In some aspects, the voice-monitoring module 18 may include threshold logic 60 for determining if the determined voice quality score 24 meets a predefined voice quality score threshold. Thresholds parameters 62 are typically defined by a configuration that occurs at the network device 14 or some other network device and include a threshold value and a condition. The threshold value may be a numeric value, for example, a value that defines a limit associated with an acceptable or not acceptable voice quality score. For example, the MOS score ranges from 1 to 5, and thus a threshold value that may be considered to identify an acceptable MOS score may be about 3 to about 4.5. The threshold conditions may include "less than," "greater than," "equal to," "less than and equal to," "greater than or equal to" or the like. For the sake of clarity, the term "meets" a threshold is used herein to define the instance in which a measured value exceeds, equals or falls short of the predefined value.

In instances in which the voice quality score 24 meets a predefined threshold 62 certain predefined actions may occur. These predefined actions are defined by threshold parameters 62 and may be configured to occur if the threshold is met once or, alternatively, the threshold logic 60 may be configured to provide for the occurrence of the predefined actions if the threshold is met a predetermined number of times. The predefined actions may include, but are not limited to, increasing the rate of monitoring voice data and determining a voice quality score, monitoring additional wireless-device-related data and/or communicating threshold notifications to the appropriate party of concern.

In some aspects, if a threshold 62 is met, monitoring of voice data 22 and, determination of the associated voice quality score 24, may occur at increased rates; i.e., shorter intervals, over a shorter time range, at the occurrence of predefined events or at the occurrence of more predefined events (i.e., events that did not trigger monitoring prior to the threshold being met). For example, if monitoring of voice data and determination of the associated voice quality score occurs once every 2 seconds prior to a threshold being met, monitoring of voice data and determination of the associated voice quality score may occur once every 5 milliseconds after the threshold has been met.

In other aspects, if a threshold 62 is met, threshold logic 60 may be operable for monitoring and storing diagnostic data or additional diagnostic data in diagnostic database 64. The threshold logic 60 may be configured such that the occurrence of a threshold being met triggers an initial monitoring and storing of diagnostic data (i.e., no monitoring of diagnostic data occurs until a threshold is met). In other aspects, in which monitoring and storing of diagnostic data occurs prior to a threshold being met, additional diagnostic data, not previously monitored and stored, may be monitored and/or previously monitored diagnostic data may be monitored and stored at a second interval less than the initial interval.

In other aspects, predefined threshold parameters 62 may be configured within the threshold logic 60 of the voice-monitoring module 18 that provide for generation of a threshold notification and communication of the same, if the predefined alert threshold is met. If a threshold is met, the threshold alert/notification logic 74 is implemented to generate an alert notification. The alert notification may subsequently be communicated, via communications module 76, to an appropriate party such as internally communicated to the user of the wireless device and/or externally communicated to the service provider via a network device, such as the user manager server or the like. In some aspects, the threshold will be a network-wide threshold implemented for all wireless devices that execute the voice-monitoring module, while in other aspects the service level provided to a user/customer will dictate alert notification thresholds. For example, based on a device characteristic, such as a device or user identification, device type or model, device hardware or software versions, a subscription level and/or a customer service code, different devices may have different thresholds. The alert notification may take the form of an email communication, a Short Message Service (SMS) communication, or the like.

Additionally, in aspects in which the voice-monitoring module is configured with threshold logic 60 operable such that meeting the threshold results in increased monitoring and quality score determination and/or the monitoring of diagnostic data or additional diagnostic data, the logic may be configured to provide for the monitoring to return to a "acceptable state" after a predetermined time period or after a predetermined quality score has been attained or maintained for a predetermined time period. "Acceptable state" is herein defined as an acceptable quality score as configured within the voice monitoring parameters 57.

As previously noted, computer platform 40 may further include a communications module 76 embodied in hardware, firmware, software, and combinations thereof, that enables communications among the various components of the wireless device 10, as well as between the wireless device 10 and the wireless network 12. The communication module may include the requisite hardware, firmware, software and/or combinations thereof for establishing a wireless communication connection. The communication module 76 is operable for communicating the voice quality scores 24 and/or the voice data 22 and/or the diagnostic data to the network device 14. The voice monitoring module may be configured to communicate the voice quality scores, voice data and/or diagnostic data at a predetermined interval, at the occurrence of a predefined event, at the request of an authorized party, such as the service provider/network device or at any other point-in-time as defined by the voice monitoring module. In aspects that utilize voice quality score thresholds, the voice-monitoring module may be configured such that the voice data, voice quality scores and/or diagnostic data is communicated only after the occurrence of a threshold being met. Alternatively, the voice data, voice quality score and diagnostic data may be communicated both prior to the occurrence of a threshold being met and after the occurrence of a threshold being met. It is also noted the voice data, the voice quality score and/or diagnostic data may be configured to be communicated individually or jointly.

Additionally, wireless device 10 has input mechanism 78 for generating inputs into wireless device, and output mechanism 80 for generating information for consumption by the user of the wireless device. For example, input mechanism 78 may include a mechanism such as a key or keyboard, a mouse, a touch-screen display, a microphone in association with a voice recognition module, etc. In certain aspects, the input mechanisms 78 provides for user input to activate an application on the wireless device. Further, for example, output mechanism 80 may include a display, an audio speaker, a haptic feedback mechanism, etc.

Figure 3:
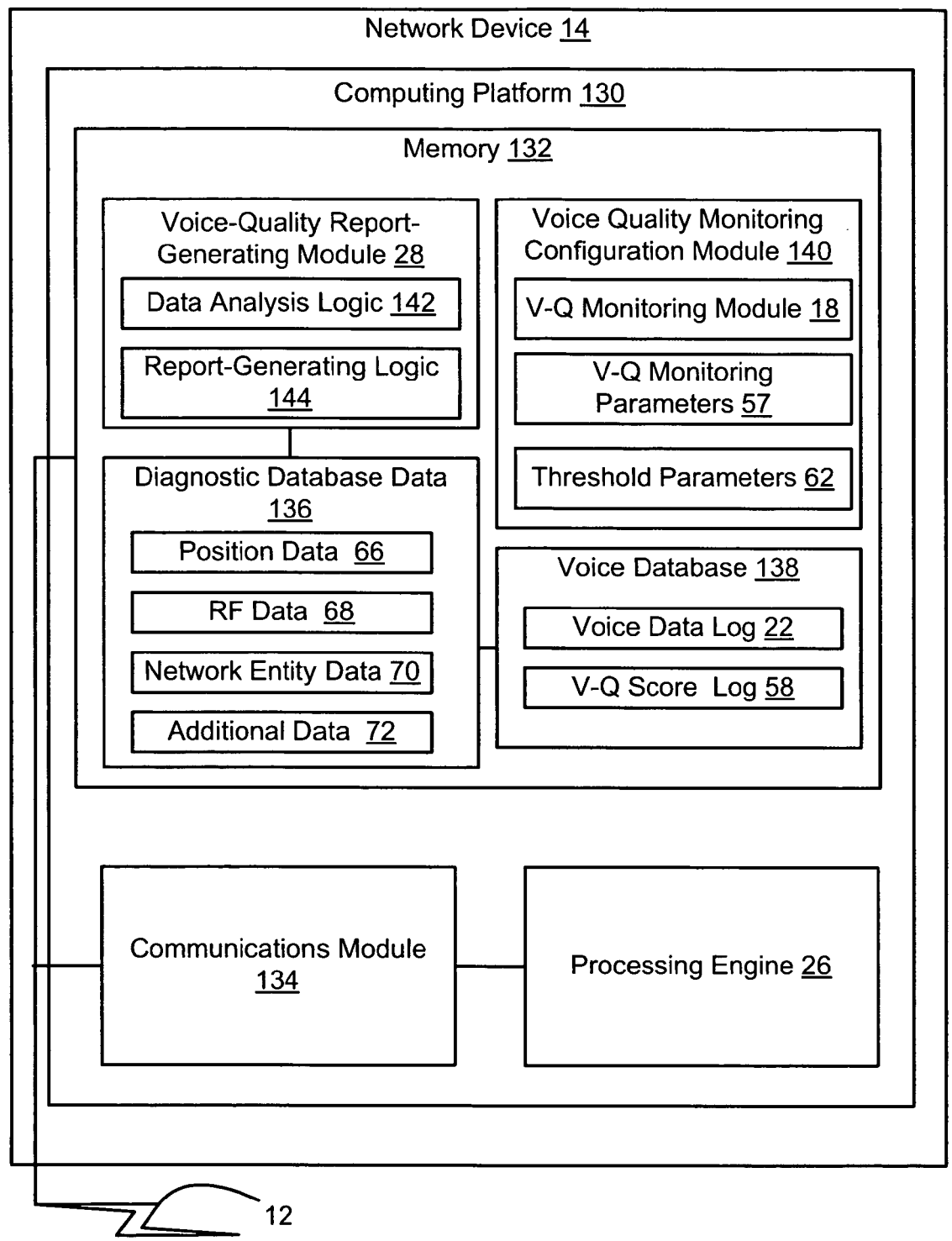
FIG. 3 is a block diagram of a network device that is operable to provide voice quality monitoring parameters and generate voice quality reports, according to one aspect.

Referring to FIG. 3, according to another aspect, a block diagram is illustrated of a network device 14, such as a user manager server. The network device may comprise at least one of any type of hardware, server, personal computer, mini computer, mainframe computer, or any computing device either special purpose or general computing device. Further, the modules and applications described herein as being operated on or executed by the network device 14 may be executed entirely on the network device 14 or alternatively, in other aspects, separate servers or computer devices may work in concert to provide data in usable formats to parties, and/or to provide a separate layer of control in the data flow between the wireless device 10 and the modules and applications executed by network device 14.

The network device 14 has computer platform 130 that can transmit and receive data across wireless network 14, and that can execute routines and applications. Computer platform 130 includes a data storage 132, which may comprise volatile and nonvolatile memory such as read-only and/or random-access memory (RAM and ROM), EPROM, EEPROM, flash cards, or any memory common to computer platforms. Further, data storage 132 may include one or more flash memory cells, or may be any secondary or tertiary storage device, such as magnetic media, optical media, tape, or soft or hard disk. Further, computer platform 130 also includes a processing engine 26, which may be an application-specific integrated circuit ("ASIC"), or other chipset, processor, logic circuit, or other data processing device. The computer platform 30 may further include a communications module 134 embodied in hardware, firmware, software, and combinations thereof, that enables communications among the various components of the network device 14, as well as between the network device 14 and the wireless network 12. For example, in the described aspects, the communication module is configured to communicate the voice-monitoring module 18 and associated voice quality monitoring parameters 57 and threshold parameters 62 to the wireless devices. In addition, the communication module is configured to receive voice quality-data, such as, voice quality score logs 58, voice data logs 22 and store such data in voice database 136. The communication module is also configured to receive diagnostic data, such as position data 66, RF data 68, network entity data 70, and additional diagnostic data 72 and store such data in diagnostic database 138. The communication module may include the requisite hardware, firmware, software and/or combinations thereof for establishing a wireless communication connection.

The data storage 132 of the network device includes voice-quality monitoring configuration module 140 operable to communicate the voice-quality monitoring module 18 to the wireless devices and to communicate configurable voice-quality monitoring parameters 57 and/or configurable threshold parameters 62 to the wireless devices. The configurable voice-quality monitoring parameters include, but are not limited to, the voice data monitoring interval, the voice data monitoring range and/or events that trigger voice data monitoring. In addition, the voice-quality monitoring parameters may include specifics as to what voice-related subsystem is to be monitored, for example sampling of the vocoder monitor subsystem. The voice-quality monitoring parameters may additionally define the voice quality routine or algorithm that is executed to determine the voice quality score. Additionally, the voice-quality monitoring parameters may define what diagnostic data is to be monitored and logged and specifics on how it is to be monitored and logged; i.e., diagnostic data monitoring interval, range, triggering event or the like. In those aspects that implement voice quality score thresholds, the voice-quality monitoring configuration module will define the threshold values and the conditions surrounding the threshold value. Additionally, the threshold parameters may define what is to occur upon having a threshold met. For example, decreasing the monitoring interval of the voice data and/or diagnostic data, monitoring diagnostic data, monitoring additional diagnostic data, sending alert notifications or the like. Once the voice-quality monitoring parameters and/or the voice quality score thresholds have been defined, the parameters and/or the thresholds are communicated to the wireless device via communication module 134.

The data storage 132 of the network device 14 includes voice-quality report generating module 28 that is operable to generate voice quality reports based on voice quality score logs and diagnostic data. In addition, the voice-quality report generating module 28 may rely on additional diagnostic data logs communicated from other network devices such as base station data or mobile switching center data communicated from network devices located at the respective network node. The voice-quality report generator module includes data analysis logic 142 for processing received voice score log 58 data and diagnostic data, such as position data 66, RF data 68, network entity data 70, additional diagnostic data 72 and the like into data that can manipulated by the voice-quality report generator module 28. The voice-quality reporting module 28 additionally includes voice-quality report generating logic 144 for converting the analyzed log data into voice-quality reports. The voice-quality reports will provide correlation between the voice scores and the diagnostic data for the purpose of providing insight into the cause or causes of voice performance degradation. In this regard, the voice quality reports may include any voice related data that is of interest to the party requesting or requiring the report function. Examples of voice-quality reports include, but are not limited to, a base-station voice quality report, a geographic-area voice quality report, a wireless communication device-type voice quality report and a wireless communication device voice quality report.

Wireless network 12 includes any communications network operable, at least in part, for enabling wireless communications between wireless device 10 and any device connected to wireless network 12. Further, wireless network 12 may include all network components, and all connected devices that form the network. For example, wireless network 12 may include at least one, or any combination, of: a cellular telephone network; a multicast network such as a Forward Link Only (FLO) network, such as the MEDIAFLO System available from Qualcomm, Inc. of San Diego, Calif.; a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association (IrDA)-based network; a short-range wireless network; a BLUETOOTH technology network; a ZIGBEE protocol network; an ultra wide band (UWB) protocol network; a home radio frequency (HomeRF) network; a shared wireless access protocol (SWAP) network; a wideband network, such as a wireless Ethernet compatibility alliance (WECA) network, a wireless fidelity alliance ("Wi-Fi Alliance") network, and a 802.11 network; a public switched telephone network; a public heterogeneous communications network, such as the Internet; a private communications network; and a land mobile radio network.

Suitable examples of telephone networks include at least one, or any combination, of analog and digital networks/technologies, such as: code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 4:
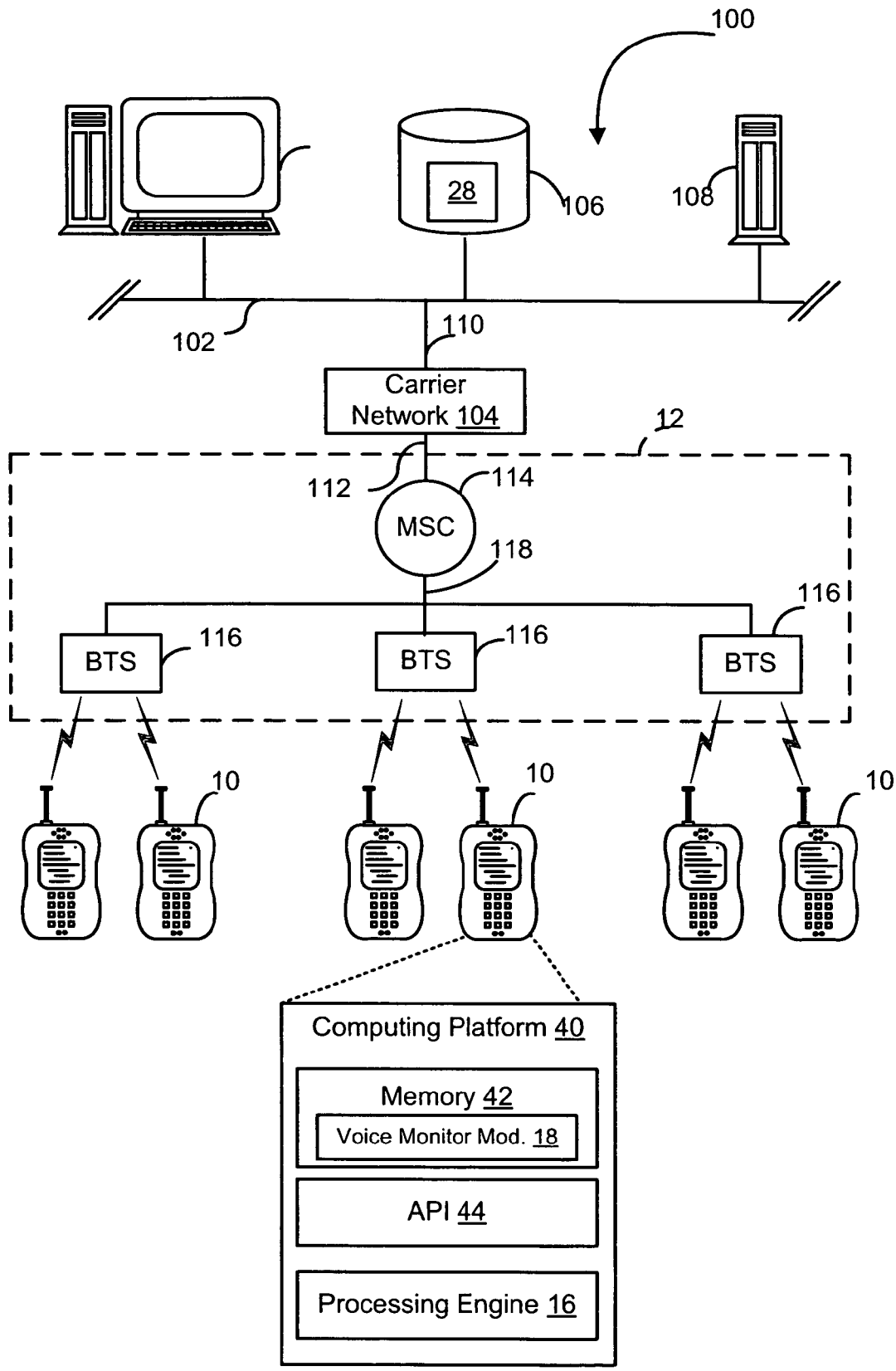
FIG. 4 is a schematic diagram of one aspect of a cellular telephone network for implementing voice quality monitoring at the wireless communication device level.

Referring to FIG. 4, in one aspect, wireless device 10 for monitoring voice quality comprises a cellular telephone. A cellular telephone system 100 may include wireless network 12 connected to a wired network 102 via a carrier network 104. Wireless devices 10 are being manufactured with increased computing capabilities and often can communicate packets including voice and data over wireless network 12. As described earlier, these "smart" wireless devices 10 have APIs 44 resident on their local computer platform 40 that allow software developers to create software applications that operate on the cellular telephone 10, and control certain functionality on the device. FIG. 3 is a representative diagram that more fully illustrates the components of a cellular wireless network and the interrelation of the elements of one aspect of the present system. Cellular wireless network 12 is merely exemplary and can include any system whereby remote modules, such as wireless devices 10 communicate over-the-air between and among each other and/or between and among components of a wireless network 12, including, without limitation, wireless network carriers and/or servers.

In system 100, network device 14 can be in communication over a wired network 102 (e.g. a local area network, LAN) with a separate data repository 106 for storing the voice quality report-generating module 28, the voice quality scores, the voice data or additional diagnostic data. Further, a data management server 108 may be in communication with network device 14 to provide post-processing capabilities, data flow control, etc. Network device 14, data repository 106 and data management server 108 may be present on the cellular telephone system 100 with any other network components that are needed to provide cellular telecommunication services. Network device 14, and/or data management server 108 communicate with carrier network 106 through a data links 110 and 112, which may be data links such as the Internet, a secure LAN, WAN, or other network. Carrier network 104 controls messages (generally being data packets) sent to a mobile switching center ("MSC") 114. Further, carrier network 104 communicates with MSC 114 by a network 112, such as the Internet, and/or POTS ("plain old telephone service"). Typically, in network 112, a network or Internet portion transfers data, and the POTS portion transfers voice information. MSC 114 may be connected to multiple base stations ("BTS") 116 by another network 118, such as a data network and/or Internet portion for data transfer and a POTS portion for voice information. BTS 118 ultimately broadcasts messages wirelessly to the wireless devices, such as wireless devices 10, by short messaging service ("SMS"), or other over-the-air methods.

Figure 5:
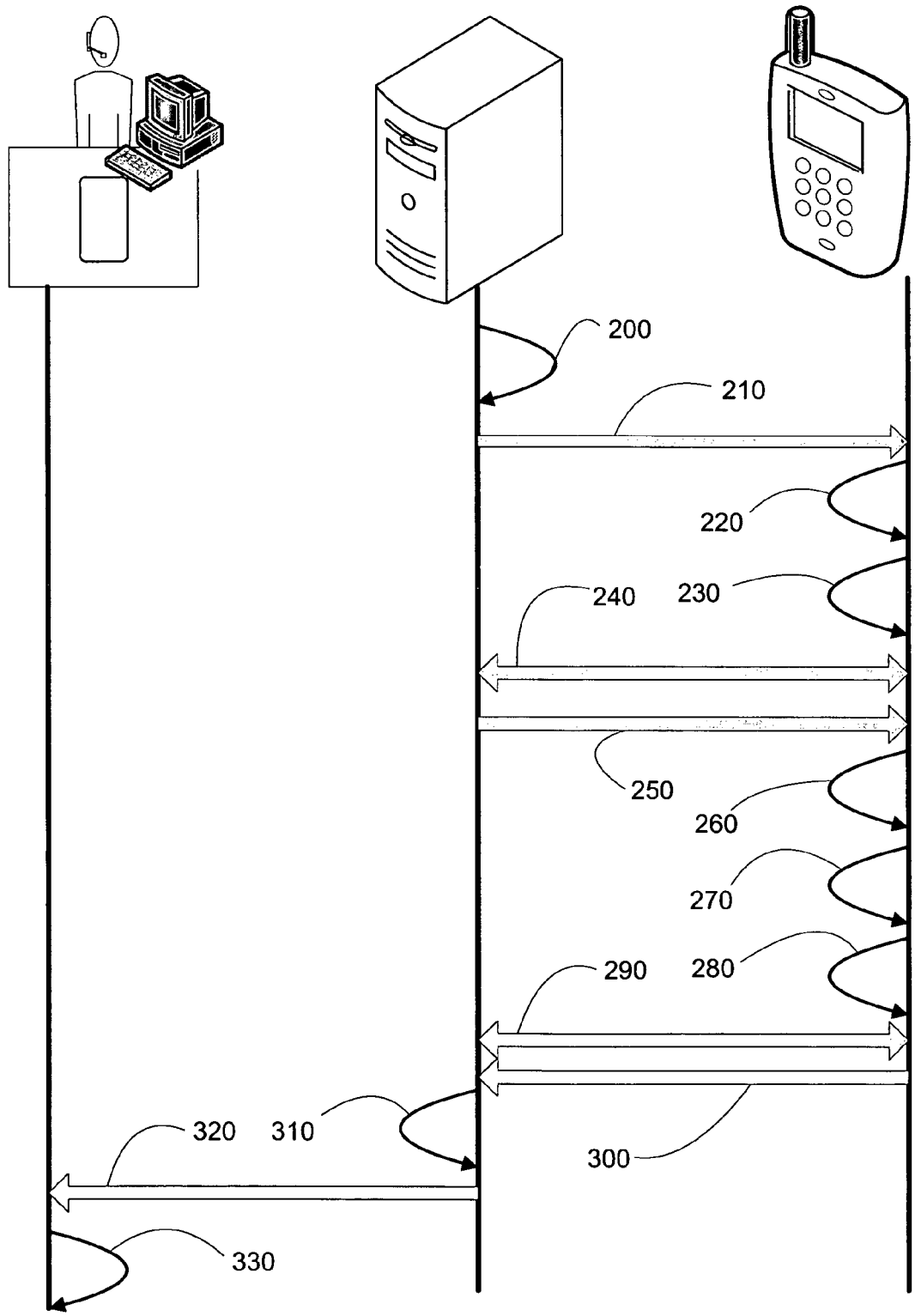
FIG. 5 is a message flow diagram for a method of providing voice quality monitoring at a wireless communication device; according to an aspect.

FIG. 5 is a message flow diagram that details a method for monitoring voice quality at a wireless device and generating voice quality reports at a network device, according to an aspect. At Event 200, the voice quality monitoring configuration module (140) of the network device (14) configures the voice monitoring and threshold parameters (57 and 62) for voice quality monitoring. These parameters may include the voice data monitoring interval, the voice data monitoring range, events that trigger voice data monitoring, data to be monitored, threshold values, threshold conditions, diagnostic data to be monitored, diagnostic data monitoring interval and the like. Additionally, if threshold parameters are configured, conditions for actions if a threshold is met may be defined, such as decreasing the voice data monitoring interval, decreasing the voice data monitoring range, additional events that trigger voice data monitoring, diagnostic data monitoring, additional monitoring of diagnostic data, alert notifications and the like.

At Event 210, the network device (14) initiates communication with the wireless device (10) by sending a bootstrap command to the voice-monitoring module (18) of the wireless device. The bootstrap command may be sent using Short Message Service (SMS) communication, Automatic Call Back (ACB) communication or any other suitable communication mechanism. At Event 220, the voice-monitoring module (18) parses the bootstrap command and, at Event 230, the voice-monitoring module invokes the communication module (76) to initiate communication with the network device. In one aspect, HyperText Transfer Protocol/Transfer Control Protocol (HTTP/TCP) is implemented as the communication protocol. At Event 240, the voice quality monitoring configuration module (140) invokes the communication module (134) to download the configurable voice monitoring and threshold parameters from the network device to the wireless device. At Event 250, the voice quality monitoring configuration module sends an acknowledgement message to the wireless device to notify the voice quality monitoring module that download of the configuration parameters is complete.

At Event 260, the voice-monitoring module (18) of the wireless device begins monitoring the voice data (22) and optionally diagnostic data (64) and determining voice quality scores (24) for the monitored voice data. At Event 270, the voice-quality module (18) determines that a voice quality score meets a defined threshold, for example indicating a decline in voice quality, and the voice-monitoring module responds by decreasing the voice data monitoring interval and monitoring diagnostic data or additional diagnostic data, such as position data, RF data and the like.

At Event 280, the voice-monitoring module desires to communicate the voice quality scores and the logged diagnostic data to the network device and invokes the communication module (76) to initiate communication with the network device. In one aspect, HyperText Transfer Protocol/ Transfer Control Protocol (HTTP/TCP) is implemented as the communication protocol. At Event 290, the voice-monitoring module (18) invokes the communication module (76) to download the logged voice quality scores and the diagnostic data from the wireless device to the network device. At Event 300, the voice-monitoring module sends an acknowledgement message to the network device to notify the network device that download of the logged data is complete.

At Event 310, the voice quality report generating module (28) of the network device (14) analyzes the voice quality score data and the diagnostic data and generates summary reports of the logged data. At Event 320, the voice quality reports are communicated from the network device to the service provider/customer care representative (20) and, at Event 330, the service provider analyzes the reports and takes appropriate network or wireless device action to rectify areas of concern within the network or device.

Figure 6:
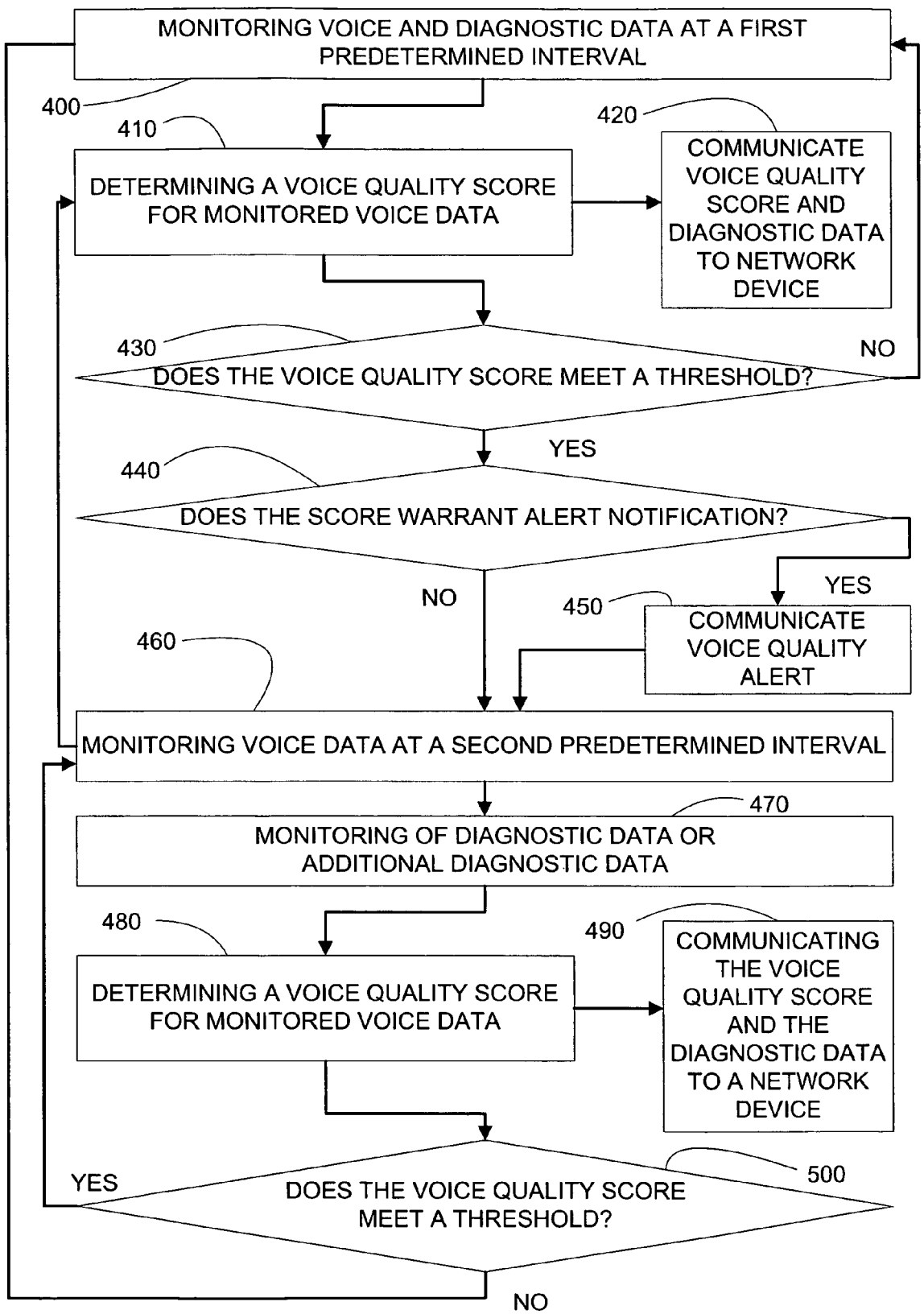
FIG. 6 is a flow diagram of a method for monitoring voice quality at a wireless communication device; according to yet another aspect.

Referring to FIG. 6, according to one aspect, a flow diagram is depicted detailing a method for voice-quality monitoring on a wireless device. At Event 400, a voice-monitoring module of a wireless device is configured to monitor and log voice data and diagnostic data at a first predetermined interval. In alternate aspects, the voice-monitoring module may be configured to only, initially, monitor and log the voice data. Typically, voice data is monitored by sampling voice data from a vocoder or some other device that records voice samples. The interval at which the voice and diagnostic data is monitored is defined within the configuration of the voice-monitoring module. The service provider, the device manufacturer, the supplier of the voice-monitoring module or any other entity that has access to the configuration parameters of the voice-monitoring module may configure the predefined interval. In addition to monitoring at a predetermined interval, the voice-monitoring module may be configured to monitor within a predetermined time range and/or monitor upon occurrence of a predetermined event At Event 410, the voice-monitoring module determines a voice quality score for the monitored voice data. The voice quality score will be determined using a voice quality routine or algorithm. In some algorithms, the voice-monitoring module determines a Mean Opinion Score (MOS) using a known MOS algorithm, such as Single Sided Speech Quality Measure ("3SQM"), defined International Telecommunications Union (ITU) standard P.563; Perceptual Speech Quality Measure ("PSQM") defined by ITU standard P.861; Perceptual Evaluation of Speech Quality ("PESQ") defined by ITU standard P.862; E Model defined by ITU standard G.107; Voice Quality Monitor ("VQmon") an extension of E Model not yet standardized by ITU or the like. In many aspects, once the voice-quality score has been determined, the score will be logged within the wireless device in an associated voice quality score log.

At Event 420, the wireless device communicates the voice quality score and diagnostic data to a network device. Communication of the voice quality score and diagnostic data may additionally include communication of the voice data. It should be noted that communication of the voice quality score to the network device may occur at any point in time and in most aspects is configurable within the voice-monitoring module. In some aspects, the voice quality score may be communicated, individually, after the score has been determined, in other aspects the voice quality scores are logged and the cumulative logged scores are communicated to the network device at a predetermined interval, upon occurrence of a predetermined event or at the bequest of service provider/ network device administrator. In certain aspects that implement voice quality score thresholds, communication of the voice quality score and related diagnostic data occurs only after a threshold has been met.

At Decision 430, the voice-monitoring module determines if the voice-quality score meets a predetermined threshold. As previously noted a threshold is defined by a value and a condition. Thresholds may be configured within the voice-monitoring module that trigger monitoring at a decreased interval (i.e. increased rate), monitoring of diagnostic data, monitoring of additional diagnostic data and/or communicating an alert notification to an appropriate party of interest. Additionally, a threshold may be configured that provides for the threshold to be met a predetermined number of times (greater than one) before a triggering event, such as decreasing the monitor interval, increasing the data monitored and/or communicating an alert notification, occurs. If the quality score does not meet the threshold, then the voice-monitoring module returns to Event 400 and monitoring continues at the initial first predetermined interval.

If the quality score does meet a defined threshold then, at Decision 440, the voice-monitoring module determines if meeting the threshold warrants an alert notification. The voice-quality monitoring module may be configured such that all thresholds being met warrant an alert notification or it may be configured such that only certain predefined thresholds being met warrant an alert notification. Typically, alert notifications will be sent to appropriate parties, such as the service provider or the like, if the voice-monitoring module is configured to send such notices or if the voice-quality score is well beyond or below the stated threshold. In some aspects, the service level being provided to a wireless device user will dictate whether the voice-monitoring module is configured to communicate alert notifications if a threshold is met. If a determination is made that the threshold being met warrants an alert notification then, at Event 450, an alert notification is communicated to the appropriate party or parties.

If a determination is made that the threshold being met does not warrant an alert notification or after an alert notification is sent then, at Event 460, the voice-monitoring module will begin monitoring at second predetermined interval that is less than the initial first predetermined interval. For example, if monitoring is initially conducted once every 1-second, once a threshold is met monitoring may occur once every 5 milliseconds (ms).

In addition to increasing the rate at which voice data is monitored the voice-monitoring module may be configured such that a threshold being met triggers, at Event 470, the monitoring of diagnostic data or, if diagnostic data was monitored prior to the threshold being met, monitoring of additional diagnostic data. In addition, voice-monitoring module may be configured such that the occurrence of a threshold being met provides for monitoring the diagnostic data at a decreased interval. At event 480, the voice quality scores, the diagnostic data and, optionally, the voice data is communicated to the network device. As previously noted, communication of the voice quality score, the voice data and/or the additional diagnostic data to the network device may occur at any point in time and in most aspects is configurable within the voice-monitoring module.

At Event 490, the voice-monitoring module determines a voice quality score for the second interval monitored voice data and, at Event 500, a determination is made as to whether the voice quality score continues to meet a threshold. If a threshold is no longer met the process returns to Event 400 and voice data monitoring is conducted at the first interval and monitoring of the diagnostic data and/or additional diagnostic data may be suspended. Alternatively, the voice-monitoring module may be configured to return to the first predetermined interval only after a specified number of occurrences (greater than one) of the threshold no longer being met. If the threshold is still being met than the process returns to Event 460 and voice data monitoring is conducted at the second interval and the monitoring of diagnostic date or additional diagnostic data continues. Alternatively, in other aspects the voice-monitoring module may be configured to suspend voice data monitoring at the second predetermined interval and the monitoring of diagnostic data or additional diagnostic data and return to the first predetermined interval after a predetermined time period or after the occurrence of other predefined events.

Figure 7:
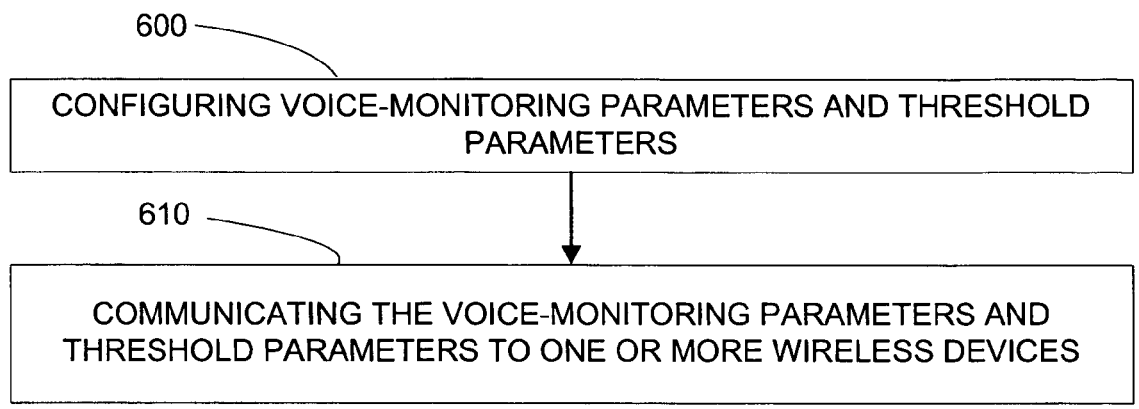
FIG. 7 is a flow diagram of a method for generating voice quality monitoring parameters at a network device; according to another aspect.

Referring to FIG. 7, according to yet another aspect, a flow diagram depicting a method for configuring a voice quality-monitoring module is presented. At Event 600, network device (14) generates voice-monitoring parameters and threshold parameters that serve to configure the voice-monitoring module execute on wireless devices. Typically, a service provider representative will communicate with the network device to configure the voice-monitoring parameters for either individual wireless devices or plurality of wireless devices. As previously noted, the voice-monitoring parameters may include, but are not limited to, the rate or interval for monitoring voice data, the event or events that trigger monitoring of voice data, the specifics on what to monitor, the routine or algorithm used to calculate the quality score, diagnostic monitoring criteria and the like. Threshold parameter may include, but are not limited to, threshold limits, threshold conditions what transpires when a threshold is met, such as decreasing the monitoring interval, monitoring of diagnostic data, monitoring of additional diagnostic data, generating and communicating alert notifications and the like. Voice-monitoring parameters and threshold parameters may be configured at the onset of implementing the voice-quality monitoring module at the wireless device or the voice-monitoring parameters can be re-configured at any point in time while the wireless device(s) are executing the voice-monitoring module. At Event 610, the network device communicates the generated voice-monitoring parameters to one or more wireless devices. Typically, the network device will initiate wireless communication with the wireless devices and proceed with wirelessly downloading the voice-monitoring and threshold parameters to the wireless device. The voice-monitoring and threshold parameters may be communicated to the wireless device(s) upon generation of the parameters or, alternatively, the generated parameters may be stored and subsequently communicated, at a predetermined time, to the wireless device(s).

Figure 8:
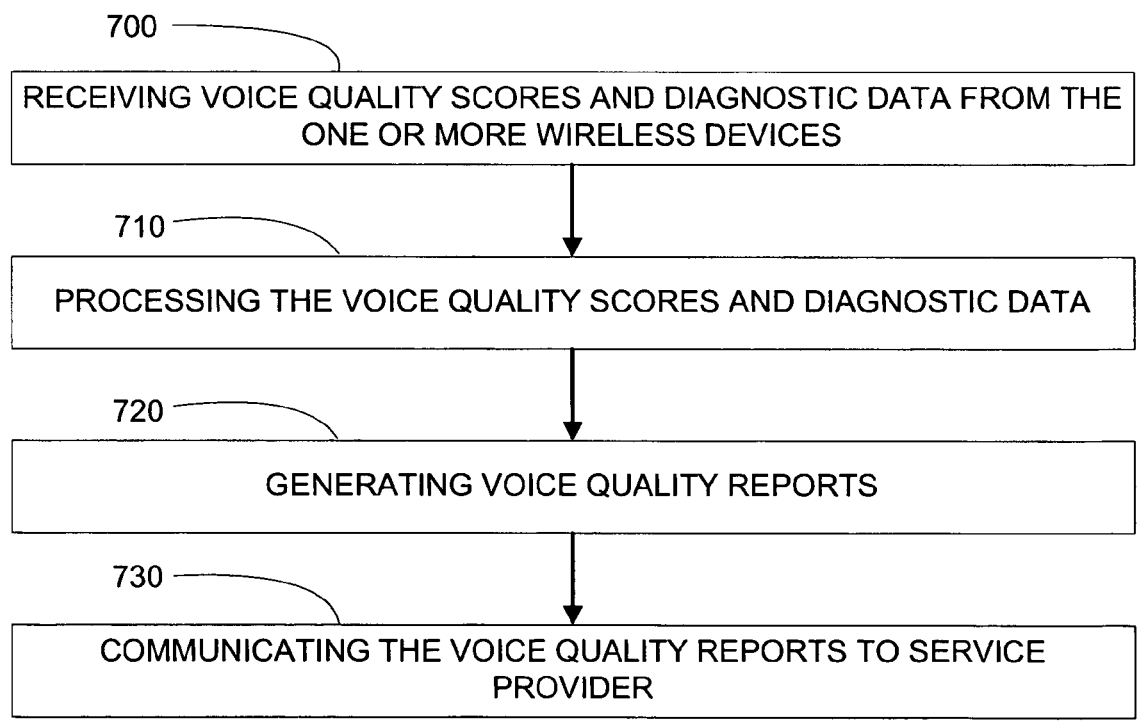
FIG. 8 is a flow diagram of a method for generating voice quality reports at a network device; according to yet another aspect.

Referring to FIG. 8, according to yet another aspect, a flow diagram depicting a method for generating voice quality reports is presented. At Event 700, a network device receives voice quality score data and diagnostic data from one or more wireless devices. The diagnostic data may include, but is not limited to, position data, RF data, network entity data, other diagnostic data or the like. As previously discussed, the need to monitor and subsequently communicate diagnostic data is based on configuration of the voice-quality monitoring module implemented on the wireless device. Monitoring of diagnostic data may be configured to occur throughout the monitoring of voice data, or monitoring of diagnostic data may be limited to occurring only when a voice quality score threshold has been met. The diagnostic data is instrumental in providing insight into why a wireless device or wireless devices are experiencing voice-quality related problems within the wireless communication network.

At Event 710, the network device analyzes and processes the voice quality score data and diagnostic data received from the wireless devices. In some aspects, the network device will receive data in logged format and, as such, the data will require appropriate processing and analysis prior to generating voice quality reports. At Event 720, the processed and analyzed voice quality score data and diagnostic data is implemented to generate voice quality reports. The voice quality reports will correlate the diagnostic data with the voice quality scores to provide insight into the cause or causes of voice quality degradation in the wireless device, wireless devices or network. As previously noted the voice quality reports may be specific to an individual wireless device or the voice quality reports may be based on a plurality of wireless devices throughout the wireless network. The voice quality reports may be based on any voice quality data received from the wireless devices implementing the voice quality module, other wireless devices not implementing the voice quality module, other network device or any other data related to voice quality. Voice quality reports may be based on any network or device attribute. For example, voice quality reports may be based on base station or other network node interaction, voice-quality score, power (i.e., RF) data, positional data, such reports based on wireless devices within a specified geographical area or voice-quality scores within a specified geographic area and the like.

At Event 730, the network device will communicate the voice quality reports to the service provider. Communication may occur across the wireless network or across a wired network. Any acceptable form of communication may be used, for example, the reports may be communicated via electronic-mail (e-mail), file transfer or the like. Once communicated to the service provider, the service provider representative may analyze the reports to identify problems related to the network or to specific wireless devices and take appropriate actions to rectify the problems within the network or at the device level.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or aspects, it should be noted that various changes and modifications could be made herein without departing from the scope of the described aspects and/or aspects as defined by the appended claims. Furthermore, although elements of the described aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

Thus, the described aspects provide for continuous monitoring of voice quality on a wireless device. The results of the monitoring can be communicated to the service provider who can then collect, analyze and/or generate reports to assess quality-related problems experienced by the communication network. In this regard, the service provider can efficiently and effectively address network-problems, thereby providing proactive support to users/customers. Monitoring thresholds can be implemented that allow for additional precautionary measures and/or further monitoring to occur if a threshold level of voice quality performance is experienced.

Many modifications and other aspects of the invention will come to mind to one skilled in the art to which this invention pertains having the benefit of the teachings presented in the foregoing descriptions and the associated drawings. Therefore, it is to be understood that the invention is not to be limited to the specific aspects disclosed and that modifications and other aspects are intended to be included within the scope of the appended claims. Although specific terms are employed herein, they are used in a generic and descriptive sense only and not for purposes of limitation.

What is claimed is:

1. A method for monitoring voice quality performance on a wireless communication device, the method comprising:
    monitoring, at a wireless communication device, voice data and diagnostic data;
    determining, at the wireless communication device, a voice quality score based upon the voice data; and
    communicating the diagnostic data and at least one of the voice quality score and the voice data to a network device.

2. The method of claim 1, wherein monitoring voice data further comprises logging voice data.

3. The method of claim 1, wherein monitoring diagnostic data further comprises logging at least one of position data, power data, hardware-related data from a state manager, application-related data or network device data.

4. The method of claim 1, wherein determining further comprises executing a voice quality algorithm.

5. The method of claim 4, wherein executing a voice quality algorithm further comprises executing a voice quality algorithm chosen from the group consisting of Mean Opinion Score (MOS), Single Sided Speech Quality Measure (3SQM), E Model, Perceptual Evaluation of Speech Quality (PESQ) and Perceptual Speech Quality Measure (PSQM).

6. The method of claim 1, wherein communicating further comprises communicating the diagnostic data, the voice data and the voice quality score to the network device.

7. The method of claim 1, further comprising comparing the voice quality score to one or more voice quality score thresholds.

8. The method of claim 7, wherein communicating further comprises communicating if the voice quality score meets one or more of the one more voice-quality score thresholds.

9. The method of claim 7, wherein monitoring further comprises monitoring at a first interval and further comprising monitoring at a second interval if the comparison determines that the voice quality score meets one of the voice quality score thresholds, wherein the second interval is less than the first interval.

10. The method of claim 9, further comprising communicating the voice data and the diagnostic data that are monitored at the second interval to the network device.

11. The method of claim 7, further comprising monitoring, at the wireless communication device, additional diagnostic data, if the comparison determines that the voice quality score meets one of the voice quality score thresholds.

12. The method of claim 11, wherein monitoring additional diagnostic data further comprises monitoring one or more additional wireless communication device-related data chosen from the group consisting of position data, power data, hardware-related data from a state manager, application-related data and network device data.

13. The method of claim 11, further comprising communicating the additional diagnostic data to the network device.

14. The method of claim 7, wherein monitoring further comprises monitoring at a first interval and further comprising monitoring at a second interval if a plurality of comparisons results in the voice quality score meeting one of the voice quality score thresholds a number of times, wherein the second interval is less than the first interval.

15. The method of claim 14, further comprising communicating the voice data and diagnostic data that are monitored at the second interval to the network device.

16. The method of claim 7, further comprising monitoring, at the wireless communication device, additional diagnostic data, if a plurality of comparisons results in the voice quality score meeting one of the voice quality score thresholds a number of times.

17. The method of claim 16, wherein monitoring additional diagnostic data further comprises monitoring one or more additional diagnostic data chosen from group consisting of position data, power data, hardware-related data from a state manager, application-related data and network device data.

18. The method of claim 16, further comprising communicating the additional diagnostic data to the network device.

19. The method of claim 7, further comprising communicating an alert message to the network device, if the comparison determines that the voice quality score meets one of the voice quality score thresholds.

20. The method of claim 7, wherein each voice quality score threshold comprises a threshold value and a threshold condition.

21. The method of claim 7, further comprising logging at least one of the voice data or the diagnostic data upon an occurrence of an event, and wherein the logging occurs upon occurrence of an additional event if the comparison determines that the voice quality score meets one of the voice quality score thresholds.

22. The method of claim 7, further comprising logging at least one of the voice data or the diagnostic data if the comparison determines that the voice quality score meets one of the voice quality score thresholds.

23. The method of claim 7, wherein at least one voice quality score threshold comprises a network-wide threshold implemented for all wireless devices.

24. The method of claim 7, wherein at least one voice quality score threshold comprises a device-specific threshold.

25. The method of claim 7, further comprising increasing a rate of monitoring or storing at least one of the voice data or the diagnostic data if the voice quality score meets at least one of the one or more voice-quality score thresholds, and returning to a prior rate of monitoring or storing at least one of the voice data or the diagnostic data after a first time period or after an acceptable voice quality score is attained or after the acceptable voice quality score is maintained for a second time period.

26. The method of claim 1, further comprising logging at least one of the voice data or the diagnostic data in the storage unit upon an occurrence of an event or during a time range.

27. The method of claim 1, wherein the diagnostic data comprises data having a correlation with a cause of a change in the voice quality score.

28. The method of claim 1, further comprising receiving a voice quality monitoring configuration, wherein the voice quality monitoring configuration comprises a configurable voice-quality parameter and a configurable voice-quality threshold, and wherein the monitoring is based on the voice quality monitoring configuration.

29. A computer-readable medium for measuring voice quality on a wireless communication device, comprising at least one sequence of instructions, wherein execution of the instructions by a processor causes the processor to perform the steps of:
monitoring, at a wireless communication device, voice data and diagnostic data;
determining, at the wireless communication device, a voice quality score based upon the voice data; and
communicating the voice quality score and diagnostic data to a network device.

30. The computer-readable medium of claim 29, wherein monitoring voice data further comprises logging voice data.

31. The computer-readable medium of claim 29, wherein monitoring diagnostic data further comprises logging at least one of position data, power data, hardware-related data from a state manager, application-related data or network device data.

32. The computer-readable medium of claim 29, wherein determining further comprises executing a voice quality algorithm.

33. The computer-readable medium of claim 32, wherein executing a voice quality algorithm further comprises executing a voice quality algorithm chosen from the group consisting of Mean Opinion Score (MOS), Single Sided Speech Quality Measure (3SQM), E Model, Perceptual Evaluation of Speech Quality (PESQ) and Perceptual Speech Quality Measure (PSQM).

34. The computer-readable medium of claim 29, wherein communicating further comprises communicating the diagnostic data, the voice data and the voice quality score to the network device.

35. The computer-readable medium of claim 29, wherein execution of the instructions causes the processor to further perform comparing the voice quality score to one or more voice quality score thresholds.

36. The computer-readable medium of claim 35, wherein communicating further comprises communicating if the voice quality score meets one or more of the one more voice-quality score thresholds.

37. The computer-readable medium of claim 35, wherein monitoring further comprises monitoring at a first interval and further comprising monitoring at a second interval if the comparison determines that the voice quality score meets one of the voice quality score thresholds, wherein the second interval is less than the first interval.

38. The computer-readable medium of claim 37, wherein execution of the instructions causes the processor to further perform communicating the voice data and the diagnostic data that are monitored at the second interval to the network device.

39. The computer-readable medium of claim 35, wherein execution of the instructions causes the processor to further perform monitoring additional diagnostic data if the comparison determines that the voice quality score meets one of the voice quality score thresholds.

40. The computer-readable medium of claim 39, wherein monitoring additional diagnostic data further comprises monitoring one or more additional wireless communication device-related data chosen from the group consisting of position data, power data, hardware-related data from a state manager, application-related data and network device data.

41. The computer-readable medium of claim 39, wherein execution of the instructions causes the processor to further perform communicating the additional diagnostic data to the network device.

42. The computer-readable medium of claim 35, wherein monitoring further comprises monitoring at a first interval and further comprising monitoring at a second interval if a plurality of comparisons results in the voice quality score meeting one of the voice quality score thresholds a number of times, wherein the second interval is less than the first interval.

43. The computer-readable medium of claim 42, further comprising communicating the voice data and diagnostic data that are monitored at the second interval to the network device.

44. The computer-readable medium of claim 35, wherein execution of the instructions causes the processor to further perform monitoring additional diagnostic data if a plurality of comparisons results in the voice quality score meeting one of the voice quality score thresholds a number of times.

45. The computer-readable medium of claim 44, wherein monitoring additional diagnostic data further comprises monitoring one or more additional diagnostic data chosen from group consisting of position data, power data, hardware-related data from a state manager, application-related data and network device data.

46. The computer-readable medium of claim 44, wherein execution of the instructions causes the processor to further perform communicating the additional diagnostic data to the network device.

47. The computer-readable medium of claim 35, wherein execution of the instructions causes the processor to further perform communicating an alert message to the network device if the comparison determines that the voice quality score meets one of the voice quality score thresholds.

48. The computer-readable medium of claim 35, wherein each voice quality score threshold comprises a threshold value and a threshold condition.

49. The computer-readable medium of claim 35, wherein execution of the instructions causes the processor to further perform logging at least one of the voice data or the diagnostic data upon an occurrence of an event, and wherein the logging occurs upon occurrence of an additional event if the comparison determines that the voice quality score meets one of the voice quality score thresholds.

50. The computer-readable medium of claim 35, wherein execution of the instructions causes the processor to further perform logging of at least one of the voice data or the diagnostic data if the comparison determines that the voice quality score meets one of the voice quality score thresholds.

51. The computer-readable medium of claim 35, wherein at least one voice quality score threshold comprises a network-wide threshold implemented for all wireless devices.

52. The computer-readable medium of claim 35, wherein at least one voice quality score threshold comprises a device-specific threshold.

53. The computer-readable medium of claim 35, wherein execution of the instructions causes the processor to further perform increasing a rate of monitoring or storing at least one of the voice data or the diagnostic data if the voice quality score meets at least one of the one or more voice-quality score thresholds, and returning to a prior rate of monitoring or storing at least one of the voice data or the diagnostic data after a first time period or after an acceptable voice quality score is attained or after the acceptable voice quality score is maintained for a second time period.

54. The computer-readable medium of claim 29, wherein execution of the instructions causes the processor to further perform logging at least one of the voice data or the diagnostic data in the storage unit upon an occurrence of an event or during a time range.

55. The computer-readable medium of claim 29, wherein the diagnostic data comprises data having a correlation with a cause of a change in the voice quality score.

56. The computer-readable medium of claim 29, wherein execution of the instructions causes the processor to further perform receiving a voice quality monitoring configuration, wherein the voice quality monitoring configuration comprises a configurable voice-quality parameter and a configurable voice-quality threshold, and wherein the monitoring is based on the voice quality monitoring configuration.

57. At least one processor device, implemented a wireless communication device, configured to perform the operations of:
    monitoring voice data and diagnostic data;
    determining a voice quality score based upon the voice data; and
    communicating the voice quality score and diagnostic data to a network device.

58. The at least one processor of claim 57, wherein monitoring voice data further comprises logging voice data.

59. The at least one processor of claim 57, wherein monitoring diagnostic data further comprises logging at least one of position data, power data, hardware-related data from a state manager, application-related data or network device data.

60. The at least one processor of claim 57, wherein determining further comprises executing a voice quality algorithm.

61. The at least one processor of claim 60, wherein the voice quality algorithm further comprises a voice quality algorithm chosen from the group consisting of Mean Opinion Score (MOS), Single Sided Speech Quality Measure (3SQM), E Model, Perceptual Evaluation of Speech Quality (PESQ) and Perceptual Speech Quality Measure (PSQM).

62. The at least one processor of claim 57, wherein communicating further comprises communicating the diagnostic data, the voice data and the voice quality score to the network device.

63. The at least one processor of claim 57, further comprising comparing the voice quality score to one or more voice quality score thresholds.

64. The at least one processor of claim 63, wherein communicating further comprises communicating if the voice quality score meets one or more of the one more voice-quality score thresholds.

65. The at least one processor of claim 63, wherein monitoring further comprises monitoring at a first interval and further comprising monitoring at a second interval if the comparison determines that the voice quality score meets one of the voice quality score thresholds, wherein the second interval is less than the first interval.

66. The at least one processor of claim 65, further comprising communicating the voice data and the diagnostic data that are monitored at the second interval to the network device.

67. The at least one processor of claim 63, further comprising monitoring additional diagnostic data if the comparison determines that the voice quality score meets one of the voice quality score thresholds.

68. The at least one processor of claim 67, wherein monitoring additional diagnostic data further comprises monitoring one or more additional wireless communication device-related data chosen from the group consisting of position data, power data, hardware-related data from a state manager, application-related data and network device data.

69. The at least one processor of claim 67, further comprising communicating the additional diagnostic data to the network device.

70. The at least one processor of claim 63, wherein monitoring further comprises monitoring at a first interval and further comprising monitoring at a second interval if a plurality of comparisons results in the voice quality score meeting one of the voice quality score thresholds a number of times, wherein the second interval is less than the first interval.

71. The at least one processor of claim 70, further comprising communicating the voice data and the diagnostic data that are monitored at the second interval to the network device.

72. The at least one processor of claim 63, further comprising monitoring additional diagnostic data if a plurality of comparisons results in the voice quality score meeting one of the voice quality score thresholds a number of times.

73. The at least one processor of claim 72, wherein monitoring additional diagnostic data further comprises monitoring one or more additional diagnostic data chosen from group consisting of position data, power data, hardware-related data from a state manager, application-related data and network device data.

74. The at least one processor of claim 72, further comprising communicating the additional diagnostic data to the network device.

75. The at least one processor of claim 63, further comprising communicating an alert message to the network device if the comparison determines that the voice quality score meets one of the voice quality score thresholds.

76. The at least one processor of claim 63, wherein each voice quality score threshold comprises a threshold value and a threshold condition.

77. The at least one processor of claim 63, further comprising logging at least one of the voice data or the diagnostic data upon an occurrence of an event, and wherein the logging occurs upon occurrence of an additional event if the comparison determines that the voice quality score meets one of the voice quality score thresholds.

78. The at least one processor of claim 63, further comprising logging of at least one of the voice data or the diagnostic data if the comparison determines that the voice quality score meets one of the voice quality score thresholds.

79. The at least one processor of claim 63, wherein at least one voice quality score threshold comprises a network-wide threshold implemented for all wireless devices.

80. The at least one processor of claim 63, wherein at least one voice quality score threshold comprises a device-specific threshold.

81. The at least one processor of claim 63, further comprising increasing a rate of monitoring or storing at least one of the voice data or the diagnostic data if the voice quality score meets at least one of the one or more voice-quality score thresholds, and returning to a prior rate of monitoring or storing at least one of the voice data or the diagnostic data after a first time period or after an acceptable voice quality score is attained or after the acceptable voice quality score is maintained for a second time period.

82. The at least one processor of claim 57, further comprising logging at least one of the voice data or the diagnostic data upon an occurrence of an event or during a time range.

83. The at least one processor of claim 57, wherein the diagnostic data comprises data having a correlation with a cause of a change in the voice quality score.

84. The at least one processor of claim 57, further comprising receiving a voice quality monitoring configuration, wherein the voice quality monitoring configuration comprises a configurable voice-quality parameter and a configurable voice-quality threshold, and wherein the monitoring is based on the voice quality monitoring configuration.

85. A wireless communication device for monitoring voice quality, the device comprising:
   a storage unit operable for storing voice data and diagnostic data; and
   a voice-monitoring module in communication with the storage unit, the voice-monitoring module operable for determining a voice quality score based upon the voice data and operable for communicating the diagnostic data and at least one of the voice quality score and the voice data to a network device.

86. The wireless communication device of claim 85, further comprising a vocoder in communication with the storage unit and operable for generating the voice data.

87. The wireless communication device of claim 86, wherein the voice data and the diagnostic data are stored at an interval.

88. The wireless communication device of claim 85, further comprising at least one device selected from the group consisting of a position sensing device, a power sensing device, a hardware monitoring device and an application monitoring device, wherein the device is in communication with the storage unit and operable for generating diagnostic data.

89. The wireless communication device of claim 85, wherein the voice-monitoring module further comprises a voice quality algorithm that is executed to determine the voice quality score.

90. The wireless communication device of claim 89, wherein the voice quality algorithm is chosen from the group consisting of Mean Opinion Score (MOS), Single Sided Speech Quality Measure (3SQM), E Model, Perceptual Evaluation of Speech Quality (PESQ) and Perceptual Speech Quality Measure (PSQM).

91. The wireless communication device of claim 85, wherein the voice-monitoring module is further operable for communicating the diagnostic data, the voice quality score and the voice data to the network device.

92. The wireless communication device of claim 85, wherein the voice-monitoring module is further operable for comparing the voice quality score to one or more voice quality score thresholds.

93. The wireless communication device of claim 92, wherein the voice-monitoring module is further operable for communicating the voice quality score and the diagnostic data to the network device if the voice quality score meets one or more of the one more voice-quality score thresholds.

94. The wireless communication device of claim 92, wherein the voice-monitoring module is further operable for increasing a rate of voice quality score determination, if the comparison determines that the voice quality score meets one of the voice quality score thresholds.

95. The wireless communication device of claim 92, wherein the voice-monitoring module is further operable for monitoring additional diagnostic data, if the comparison determines that the voice quality score meets one of the voice quality score thresholds.

96. The wireless communication device of claim 95, wherein the additional diagnostic data further comprises data chosen from the chosen from the group consisting of position data, power data, hardware-related data from a state manager, application-related data and network device data.

97. The wireless communication device of claim 95, wherein the voice-monitoring module is further operable for communicating the additional diagnostic data to the network device.

98. The wireless communication device of claim 92, wherein the voice-monitoring module is further operable for communicating an alert message to the network device, if the comparison determines that the voice quality score meets one of the voice quality score thresholds.

99. The wireless communication device of claim 85, wherein the voice-monitoring module is further operable for logging at least one of the voice data or the diagnostic data in the storage unit upon an occurrence of an event or during a time range.

100. The wireless communication device of claim 85, wherein the diagnostic data comprises data having a correlation with a cause of a change in the voice quality score.

101. The wireless communication device of claim 92, wherein each voice quality score threshold comprises a threshold value and a threshold condition.

102. The wireless communication device of claim 92, wherein the voice-monitoring module is triggered to log at least one of the voice data or the diagnostic data in the storage unit if the comparison determines that the voice quality score meets one of the voice quality score thresholds.

103. The wireless communication device of claim 92, wherein the voice-monitoring module is further operable for logging at least one of the voice data or the diagnostic data in the storage unit upon an occurrence of an event, and wherein the logging occurs upon occurrence of an additional event if the comparison determines that the voice quality score meets one of the voice quality score thresholds.

104. The wireless communication device of claim 92, wherein at least one voice quality score threshold comprises a network-wide threshold implemented for all wireless devices.

105. The wireless communication device of claim 92, wherein at least one voice quality score threshold comprises a device-specific threshold.

106. The wireless communication device of claim 92, wherein the voice-monitoring module is further operable for increasing a rate of monitoring or storing at least one of the voice data or the diagnostic data if the voice quality score meets at least one of the one or more voice-quality score thresholds, and for returning to a prior rate of monitoring or storing at least one of the voice data or the diagnostic data after a first time period or after an acceptable voice quality score is attained or after the acceptable voice quality score is maintained for a second time period.

107. The wireless communication device of claim 85, wherein the voice-monitoring module is further operable for receiving a voice quality monitoring configuration, wherein the voice quality monitoring configuration comprises a configurable voice-quality parameter and a configurable voice-quality threshold, wherein the voice-monitoring module monitors the voice data and the diagnostic data based on the voice quality monitoring configuration.

108. A wireless communication device, comprising:
means for monitoring voice data and diagnostic data;
means for determining a voice quality score based upon the voice data; and
means for communicating the voice quality score and the diagnostic data to a network device.

109. The wireless communication device of claim 108, wherein the means for monitoring the voice data further comprises means for logging the voice data.

110. The wireless communication device of claim 108, wherein the means for monitoring the diagnostic data further comprises means for logging at least one of position data, power data, hardware-related data from a state manager, application-related data or network device data.

111. The wireless communication device of claim 108, wherein the means for determining further comprises means for executing a voice quality algorithm.

112. The wireless communication device of claim 111, wherein the voice quality algorithm is chosen from the group consisting of Mean Opinion Score (MOS), Single Sided Speech Quality Measure (3SQM), E Model, Perceptual Evaluation of Speech Quality (PESQ) and Perceptual Speech Quality Measure (PSQM).

113. The wireless communication device of claim 108, wherein the means for communicating further comprises means for communicating the diagnostic data, the voice data and the voice quality score to the network device.

114. The wireless communication device of claim 108, further comprising means for comparing the voice quality score to one or more voice quality score thresholds.

115. The wireless communication device of claim 114, wherein the means for communicating further comprises means for communicating if the voice quality score meets one or more of the one more voice-quality score thresholds.

116. The wireless communication device of claim 114, wherein the means for monitoring further comprises means for monitoring at a first interval, and further comprising means for monitoring at a second interval if the comparison determines that the voice quality score meets one of the voice quality score thresholds, wherein the second interval is less than the first interval.

117. The wireless communication device of claim 116, further comprising means for communicating the voice data and the diagnostic data that are monitored at the second interval to the network device.

118. The wireless communication device of claim 114, further comprising means for monitoring additional diagnostic data if the comparison determines that the voice quality score meets one of the voice quality score thresholds.

119. The wireless communication device of claim 118, wherein the additional diagnostic data further comprises one or more additional wireless communication device-related data chosen from the group consisting of position data, power data, hardware-related data from a state manager, application-related data and network device data.

120. The wireless communication device of claim 118, further comprising means for communicating the additional diagnostic data to the network device.

121. The wireless communication device of claim 114, wherein the means for monitoring further comprises means for monitoring at a first interval and further comprising means for monitoring at a second interval if a plurality of comparisons results in the voice quality score meeting one of the voice quality score thresholds a number of times, wherein the second interval is less than the first interval.

122. The wireless communication device of claim 121, further comprising means for communicating the voice data and the diagnostic data that are monitored at the second interval to the network device.

123. The wireless communication device of claim 114, further comprising means for monitoring additional diagnostic data if a plurality of comparisons results in the voice quality score meeting one of the voice quality score thresholds a number of times.

124. The wireless communication device of claim 123, wherein the additional diagnostic data further comprises one or more additional diagnostic data chosen from group consisting of position data, power data, hardware-related data from a state manager, application-related data and network device data.

125. The wireless communication device of claim 123, further comprising means for communicating the additional diagnostic data to the network device.

126. The wireless communication device of claim 114, further comprising means for communicating an alert message to the network device if the comparison determines that the voice quality score meets one of the voice quality score thresholds.

127. The wireless communication device of claim 108, further comprising means for logging at least one of the voice data or the diagnostic data upon an occurrence of an event or during a time range.

128. The wireless communication device of claim 108, wherein the diagnostic data comprises data having a correlation with a cause of a change in the voice quality score.

129. The wireless communication device of claim 114, wherein each voice quality score threshold comprises a threshold value and a threshold condition.

130. The wireless communication device of claim 114, further comprising means for logging at least one of the voice data or the diagnostic upon an occurrence of an event, and wherein the logging occurs upon occurrence of an additional event if the comparison determines that the voice quality score meets one of the voice quality score thresholds.

131. The wireless communication device of claim 114, further comprising means for logging of at least one of the voice data or the diagnostic data if the comparison determines that the voice quality score meets one of the voice quality score thresholds.

132. The wireless communication device of claim 114, wherein at least one voice quality score threshold comprises a network-wide threshold implemented for all wireless devices.

133. The wireless communication device of claim 114, wherein at least one voice quality score threshold comprises a device-specific threshold.

134. The wireless communication device of claim 114, further comprising means for increasing a rate of monitoring or storing at least one of the voice data or the diagnostic data if the voice quality score meets at least one of the one or more voice-quality score thresholds, and means for returning to a prior rate of monitoring or storing at least one of the voice data or the diagnostic data after a first time period or after an acceptable voice quality score is attained or after the acceptable voice quality score is maintained for a second time period.

135. The wireless communication device of claim 108, further comprising means for receiving a voice quality monitoring configuration, wherein the voice quality monitoring configuration comprises a configurable voice-quality parameter and a configurable voice-quality threshold, and wherein the means for monitoring operates based on the voice quality monitoring configuration.

* * * * *